United States Patent [19]
Heukensfeldt Jansen

[11] Patent Number: 6,049,083
[45] Date of Patent: Apr. 11, 2000

[54] VARIABLE LENGTH SOURCE FOR TRANSMISSION SCANNING

[76] Inventor: Floribertus P.M. Heukensfeldt Jansen, 20550 Coventry Dr., Brookfield, Wis. 53005

[21] Appl. No.: 09/001,567

[22] Filed: Dec. 31, 1997

[51] Int. Cl.[7] ........................................... G01T 1/00
[52] U.S. Cl. ........................ 250/363.04; 250/496.1; 250/497.1; 250/498.1
[58] Field of Search ................... 250/363.04, 496.1, 250/497.1, 498.1; 378/150, 160

[56] References Cited

U.S. PATENT DOCUMENTS 5,552,606  9/1996  Jones et al. .

*Primary Examiner*—Constantine Hannaher
*Assistant Examiner*—Andrew Israel
*Attorney, Agent, or Firm*—Michael A. Jaskolski; Christian G. Cabou; Phyllis Y. Price

[57] ABSTRACT

Gamma transmission apparatus for use with a gamma camera for reducing transmission imaging period duration, wherein a camera processor is only capable of a maximum number of calculations per second, each photon detected by the camera requires a specific number of calculations and some of the detected photons are not useful for imaging purposes, the apparatus modifying the effective length of an imaging beam to reduce transmission line length thereby eliminating photons which cannot be used for imaging and freeing processor time to process photons useable for imaging thereby increasing imaging speed.

10 Claims, 5 Drawing Sheets

VARIABLE LENGTH SOURCE FOR TRANSMISSION SCANNING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to gamma cameras and more particularly to an apparatus and method used with a line transmission source to modify the effective length of the line source thereby improving camera image quality and decreasing imaging time.

Single photon emission computed tomography (SPECT) examinations are carried out by injecting a dilution marker comprising a compound labeled with a radiopharmaceutical into the body of a patient to be examined. A radiopharmaceutical is a substance that emits photons at one or more energy levels. By choosing a compound that will accumulate in an organ to be imaged, compound concentration, and hence radiopharmaceutical concentration, can be substantially limited to an, organ of interest. A radiopharmaceutical that emits photons or gamma emissions which are approximately at a, single known energy level is chosen.

While moving through a patient's blood stream the marker, including the radiopharmaceutical, becomes concentrated in the organ to be imaged. By measuring the number of photons emitted from the organ which are at approximately the known energy range, organ characteristics, including irregularities, can be identified.

To measure the number of emitted photon a planar gamma camera is used. A gamma camera consists of a stand that supports a collimator, a scintillation crystal and a plurality of photomultiplier tubes (PMTs). The collimator typically includes a rectangular lead block having a width dimension and a length dimension which together define a camera field of view (FOV). The collimator block forms tiny holes which pass therethrough defining preferred photon paths. The preferred paths are usually unidirectional and perpendicular to the length of the collimator. The collimator blocks emissions toward the crystal along non-preferred paths.

After a marker has become concentrated within an organ to be imaged, a portion of a patient's body including the organ is positioned within the camera FOV. For the purposes of this explanation, while the organ and portion of a patient's body to be imaged can be any organ and surrounding biological tissue, it will be assumed that the organ to be imaged is an appendix, the portion of the body placed within the FOV includes a human torso and the portion of the torso including the appendix is a swath twenty centimeters long. The twenty centimeter swath will be referred to hereinafter as the torso segment.

The scintillation crystal is positioned adjacent the collimator on a side opposite the patient. The crystal detects photons that pass through the collimator on a front surface and emits light from a back surface each time a photon is detected. The amount of light emitted depends on the detected photon's energy level.

The PMTs are positioned adjacent the crystal and on a side of the crystal opposite the collimator. Light emitted by the crystal is detected by the PMTs which in turn generate analog intensity signals. A processor receives the intensity signals and digitally stores corresponding information as an M by N array of elements called pixels. Together the array of pixel information is used by the processor to form an emission image corresponding to the specific camera position.

Most gamma camera systems generate a plurality of emission images, each taken by positioning the detector parallel to, and at an angle about, a rotation axis which passes through the organ to be imaged. The angle is incremented between views so that the plurality of images can be used to construct pictures of transaxial slices of the torso section using algorithms and iterative methods that are well known to those skilled in the tomographic arts.

Because different materials are characterized by different attenuation coefficients, photons are attenuated to different degrees as they pass through different portions of the torso segment. For example, an inch of bone will typically attenuate a greater percentage of photons than an inch of tissue. Similarly, air filled space in a lung cavity or the like will attenuate less photons than a comparable space filled with tissue or bone. In addition, photons passing through four inches of tissue will be attenuated to a greater degree than photons passing through one inch of tissue. Thus, because the appendix is located on one side of a body, photon density on the appendix side of the body will typically be greater than density on the other side. Non-uniform attenuation about the appendix causes emission imaging errors such as image artifacts which can obscure images and reduce diagnostic effectiveness.

Attenuation caused by different biological materials within the torso segment can be compensated for by generating a body attenuation map and using the attenuation map to correct emission images. An attenuation map is a map which clearly indicates attenuation characteristics of different portions of the torso segment. For example, a map for the torso segment would indicate little attenuation in an air filled cavity, relatively greater attenuation in a muscle fiber and still greater attenuation in a bone section.

Torso segment attenuation can be directly measured by using transmission computed tomography techniques wherein the torso segment is positioned within a three dimensional imaging area and a source projects an even flow of photons through the imaging area toward a planar gamma camera like the emission camera described above. The distance between the source and camera defines one imaging area dimension. The other two imaging area dimensions are defined by the camera's FOV.

When a torso segment is positioned within a FOV, typically the segment will only block a portion of the FOV. In this case, while some of the transmission photons have flight paths which intersect the torso segment, other photons have paths which do not intersect the torso segment. This is particularly true when a torso segment is imaged from the side as most torso segments have a relatively narrow girth when compared to torso width. Hereinafter, photons having paths which intersect the torso segment will be referred to as intersecting photons. Photons having paths which do not intersect the torso segment will be referred to as non-intersecting photons.

Radiation received by the camera on the opposite side of the patient includes intersecting photons which are not attenuated by the torso segment and all non-intersecting photons. As with emission imaging, in transmission imaging, the scintillation crystal generates light each time a photon is detected and PMTs detect the light and generate intensity signals corresponding to each detected photon. A camera processor receives the intensity signals and performs a series of calculations corresponding to each detected photon to determine photon impact position. The position information is then used to generate a transmission image.

The source and detector are rotated about the torso segment to generate transmission images corresponding to a multiplicity of angles. The transmission images are reconstructed into the attenuation map using conventional tomography algorithms.

By collecting data corresponding to the intensity of the photon emissions and the intensity of the photon transmissions through the torso segment at the same gantry angles, a processor may use the non-uniform attenuation map to correct emission images collected during emission studies.

Because a planar source often causes excessive photon scatter, nearly all transmission sources are scanning line transmission sources. As the name implies, a scanning line transmission source is a source which generates a line beam of photons for imaging. Because the line source only generates a single line of photons, the line source can only be used to generate imaging data corresponding to a single slice of the torso segment at a time. To generate imaging data corresponding to the entire torso segment, the source is typically mounted for movement along a track. The track is usually parallel to a first camera dimension (e.g. width) and the source is mounted perpendicular to the track and therefore parallel to the second camera dimension (e.g. length). After the source is used to image one segment slice, the source is moved along the track to an adjacent location and is used to image an adjacent and parallel slice. In the present example, this process of moving and imaging continues across the entire twenty centimeter torso segment generating data corresponding to all segment slices within the segment length. In the alternative, the line source is scanned across the imaging area to generate imaging data for the entire torso segment, hence the term "scanning" line source.

The camera used for transmission imaging can be either a dedicated transmission camera separate from the emission camera or it can be the emission camera. In either case, the transmission photons are at a different energy level than the emission photons, and transmission imaging and emission imaging can be performed at the same time.

Perhaps the most important criterion for judging the usefulness of any transmission imaging system is the quality of the images generated by the system. In order to generate a useable image, at least a threshold number $T_P$ of intersecting photons which pass through the torso segment have to be detected by the scintillation crystal. For example, it may be necessary to detect at least 100,000 intersecting photons per centimeter slice of the torso segment to construct a useful transmission image. Where the torso segment is 20 centimeters long, the threshold number of intersecting photons $T_P$ would be 2 million.

For the purpose of this explanation, the term source activity will be used to refer to the number of photons generated by a source per second per centimeter of line beam length. In addition, the time required to scan a line transmitter across a FOV to generate an image at one imaging angle will be referred to as an imaging period. Moreover, the time required to generate images at all angles required to generate a tomographic image will be referred to as an imaging session.

Given any source activity, the threshold number $T_P$ of detected intersecting photons required to generate an image can be achieved by simply adjusting the duration of the imaging period. In the example above, where 100,000 photons have to be detected per centimeter slice of the torso segment and the slice is 20 centimeters long, assuming a first source activity which results in an average of 50,000 intersecting photon detected per second, the transmitter can be moved across the FOV at a rate of 0.5 cm/sec so that a total imaging period $T_I$ is 40 seconds. Period $T_I$ can be expresses as:

$$T_I = \frac{T_P}{P_{AI}} \qquad \text{Eq. 1}$$

where $P_{AI}$ is the number of detected intersecting photons per second. At a second and reduced source activity resulting in 10,000 intersecting photon detected per second, the source can be moved across the FOV at a rate of 0.10 cm/sec so that, according to Equation 1 the total imaging period $T_I$ is extended to 200 seconds. In either case, the threshold number of detected intersecting photons is achieved and a useable image can be generated.

Unfortunately, in addition to image quality, another important system criterion is patient throughput. Imaging systems are relatively expensive diagnostic tools and therefore the cost of such systems is usually only justifiable where a large number of patients are examined each day. High throughput is also important for other reasons. For example, speedy imaging sessions advantageously minimize patient discomfort. Many patients are uncomfortable lying still during long imaging periods. While an extended imaging period at one angle with respect to the rotation axis might not be objectionable, where a large number (e.g. 60) of imaging periods at different angles are required to generate a tomographic image, the time required to complete an entire imaging session can be objectionable. In these cases, adding even a few seconds to each imaging period to achieve threshold photon levels can increase patient discomfort appreciably.

In addition, extended imaging sessions can lead to imaging errors. Ideally imaging should be performed while a patient remains completely still. If a patient moves during imaging, the resulting images can be blurred and their usefulness as diagnostic tools reduced. The likelihood of patient movement increases as imaging session duration increases.

One solution to increase imaging speed and hence throughput, is to increase transmission source activity thereby increasing the rate of intersecting photon absorption $P_{AI}$. With a more active transmission source, threshold photon level $T_P$ can be achieved in less time thereby enabling a quicker scanning speed, shorter imaging periods $T_I$ and much shorter imaging sessions.

While a more active transmitter appears to be a viable solution for shortening imaging sessions without reducing image quality, unfortunately maximum transmitter activity is limited by imaging camera constraints. In particular, while camera processors are extremely fast, each process is only capable of processing a maximum number of detected photons per second MPPS where the MPPS can be expressed as:

$$MPPS = \frac{MCPS}{C_a} \qquad \text{Eq. 2}$$

where MCPS is a maximum number of calculations per second that the processor is capable of performing and $C_a$ is the number of calculations required to process each detected photon. If the number of photons generated by a transmission source causes the quantity of detected photons (i.e. $P_{AI}+P_{AN}$; where $P_{AN}$ is the number of non-intersecting photons) to exceed the MPPS, the processor experiences "dead time" during which data related to some detected photons is effectively lost. Dead time results from the processor either failing to recognize essentially simultaneously detected photons and ignoring one of the photons or recognizing essentially simultaneously detected photons but processing light associated with both photons as a single photon thereby causing quantitative errors and image artifacts.

Because transmission source activity is limited, imaging speed is also limited. For example, at maximum allowable transmission source activity, the total number of detected photons should equal the MPPS such that:

$$MPPS = P_{AI} + P_{AN} \quad \text{Eq. 3}$$

where $P_{AI}$ is the number of detected intersecting photons and $P_{AN}$ is a number of detected non-intersecting photons. Combining Equations 1 and 3, imaging period $T_I$ can be expressed as:

$$T_I = \frac{T_P}{MPPS - P_{AN}} \quad \text{Eq. 4}$$

Given a specifically sized torso segment to be imaged, the number of detected intersecting photons $T_P$ required to generate an image remains constant. In addition, given a specific processor, the MMPS remains unchanged. Moreover, given a specific segment slice to be imaged and a maximum allowable transmission source activity, the number of detected non-intersecting photons $P_{AN}$ is constant. Therefore, period $T_I$ cannot be reduced further using a conventional transmission imaging system.

As imaging speed is important, it would be advantageous to have an apparatus which can be used with a scanning line transmitter and a gamma camera to reduce the duration of an imaging session without decreasing imaging quality despite processor calculation limitations.

BRIEF SUMMARY OF THE INVENTION

It has been recognized that many photons generated during an imaging period are not used to construct an image but nevertheless require dedicated processor time when the photons are detected by the scintillation crystal. In particular, non-intersecting photons having flight paths which do not intersect the torso segment are not used to generate an image but nevertheless require processor time when detected.

According to the present invention, an apparatus is provided for modifying the effective length of a line transmitter to minimize the quantity of non-intersecting photons without affecting the quantity of intersecting photons. Assuming transmission source activity is set at a level where the number of detected photons (non-intersecting $P_{AN}$ and intersecting $P_{AI}$ combined) is equal to the MPPS so that transmission source activity cannot be increased without causing excessive dead time (there will always be some dead time because events occur randomly—the emphasis here is on "excessive"), when the quantity of non-intersecting photons is reduced, the total number of photons detected by the scintillation crystal is likewise reduced. When the total number of detected photons is reduced, the number of calculations required to accommodate all of the detected photons is also reduced such that the number of calculations required to accommodate the detected photons is less than the MCPS. Thus, the camera processor has excess calculating capability.

With excess calculating capability, rate of transmitted photons detected can be increased until the quantity of detected intersecting photons is equal to the MPPS. Because transmission source activity can be increased without overburdening the processor and thereby causing dead time, scanning and imaging speed can be increased thereby reducing overall imaging session duration.

A quantitative example of how the inventive apparatus might operate to reduce imaging time is instructive. Assume that the torso segment is positioned within an imaging area. When a transmitter shutter is opened, the transmitter generates photons directed across a slice of the imaging area toward the camera. Flight paths of intersecting photons intersect the torso segment. Some intersecting photons pass through the torso segment and are detected by the crystal. Flight paths of non-intersecting photons do not intersect the torso segment but pass tangent thereto and are detected by the crystal.

For the purpose of this explanation, it will be assumed that a processor's MPPS is one million detected photons per second. In addition, it will be assumed that transmission source activity is at a first level causing the combined (1) number of intersecting photons that pass through the torso segment and are detected by the crystal and (2) number of non-intersecting photons detected by the crystal to be one million so that the processor is performing calculations for the MPPS and transmitter activity cannot be increased without causing excessive dead time. Moreover, it will be assumed that one fourth, or 250,000 of the detected photons per second are intersecting (i.e. $P_{AI}=250,000$) and the remaining 750,000 detected photons per second are non-intersecting (i.e. $P_{AN}=750,000$). Furthermore, it will be assumed that the torso segment is 20 centimeters long and one million detected photons per segment centimeter are required to generate a useable transmission image (i.e. $T_P=20$ million). Given these numbers for the transmission source activity set at this first level, according to Equation 1 a transmission scan during one imaging period at one imaging angle requires 80 seconds.

As indicated above, none of the non-intersecting photons pass through the torso segment and therefore none of the non-intersecting photons are useful for imaging purposes. Despite their uselessness, each non-intersecting photon is detected by the crystal and associated intensity signals must be processed by the processor. In the present example, because three fourths of the detected photons are non-intersecting photons, three fourths of the processor calculations are dedicated to the non-intersecting photons.

According to the present invention, in the present example, the effective transmitter length is reduced by approximately 50% as the torso segment only blocks half of the FOV. Assuming that the first transmitter activity level is maintained, when the effective transmitter length is reduced by 50% substantially all non-intersecting photons are eliminated and almost all of the photons detected by the crystal are intersecting and useable for imaging. In the present example, assuming an ideal condition wherein all of the non-intersecting photons are eliminated by shortening the beam length and the transmission source is at the first activity level, only 250,000 photons per second (i.e. $P_{AI}$) are detected by the crystal, all of the detected photons being intersecting photons. The absorption rate (i.e. 250,000 photons/sec.) is one fourth the rate which can be handled by the camera processor (i.e. is one-fourth MPPS).

For this reason, transmission source activity can be increased to a second level which is higher than the first level thereby increasing the number of detected intersecting photons per second $P_{AI}$ which in turn means that scanning speed can be increased to decrease image period $T_I$. Specifically, assuming that the number of intersecting photons which pass through the torso segment is linearly related to transmission source power, a transmission source capable of causing transmission source activity which is four times greater than the original activity can be provided thereby increasing the number of detected intersecting photons by 400% to one million. At the second power level, according to Equation 1 imaging period $T_I$ required to scan the 20 centimeter torso segment and generate one million detected intersecting photons per segment centimeter is 20 seconds, one fourth the time required to generate the same number of detected intersecting photons at the first power level. In other words, referring to Equation 3, by reducing detected non-intersecting photons $P_{AN}$, detected intersecting photons $P_{AI}$ can be increased (by increasing transmitter power) without exceeding the processor's MPPS. Referring also to Equation 1, where the quantity of photons $P_{AI}$ is increased, imaging period $T_I$ is reduced.

While saving 60 seconds during one imaging period may not seem appreciable, when a large number of images from different angles is required, 60 seconds per image accumulates quickly and can appreciably affect patient throughput.

Clearly, the example above is ideal and some of the quantitative relationships have been simplified in the interest of simplifying the present explanation. Nevertheless, this example indicates the value of the present invention in reducing the duration of imaging periods.

In addition to including a simple mechanism for reducing the effective length of the transmission source, the invention also includes an apparatus and method for use with the length adjusting mechanism to identify an ideal effective transmission source length wherein non-intersecting photons are minimized.

Objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

A. Hardware Configuration

Figure 1:
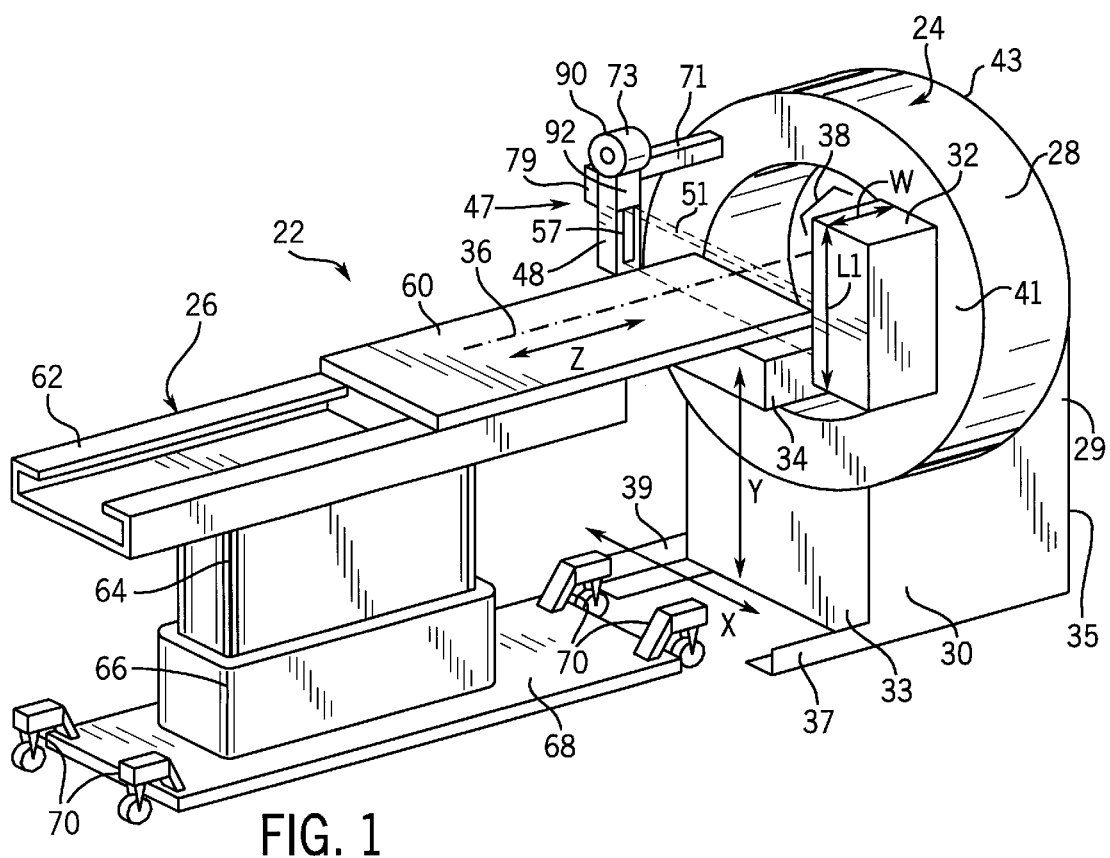
FIG. 1 is a perspective view of the present invention illustrated in the context of an imaging system.

Referring now to the drawings, wherein like reference numerals represent corresponding elements throughout the several views, and more specifically, referring to FIG. 1, there is shown, generally at 22, an imaging system including a tomography machine 24 and a patient support table 26.

Table 26 includes a top surface 60 interleaved to a lower bracket member 62 which allows supported movement of surface 60 along a horizontal Z-axis. Bracket member 62 is supported by a vertical leg 64 which extends upwardly from a collar 66. The length of leg 64 can be increased or decreased to raise or lower top surface 60 along a vertical Y-axis. Collar 66 is secured to a planar dolly 68 having four wheels collectively identified by the numeral 70, one wheel 70 attached at each of four corners. Wheels 70 allow an operator to move the entire table 26 laterally along an X-axis or along the Z-axis. Thus, table 26 allows an operator to move top surface 60 and a patient thereon within a range of three dimensional space.

Tomography machine 24 includes a pedestal 30, a gantry 28, two planar gamma cameras 32, 34, and a gamma transmission assembly 47. Pedestal 30 has a front end 33 and a back end 35 and includes two stabilizing legs 37, 39 which extend forward from the front end 33, distal ends of the legs 37, 39 contacting a ground surface in front of the pedestal 30 to stabilize the pedestal front end 33 as the tomography machine 24 is generally front end heavy. The top surface of the pedestal 30 is generally shaped concavely upward so as to receive an outer surface of gantry 28. In addition, although not shown, the pedestal 30 may also house a gantry motor for rotating the gantry 28 about a central gantry rotation axis 36.

The gantry 28 is generally doughnut shaped about axis 36. Pedestal 30 supports gantry 28 in an upright vertical orientation so that its rotation axis 36 is horizontal and can be parallel to the support table Z-axis. Gantry 28, like pedestal 30, has a front end and a back end defined by front and back surface 41 and 43, respectively. The gantry 28 can rotate about central rotation axis 36.

Figure 2:
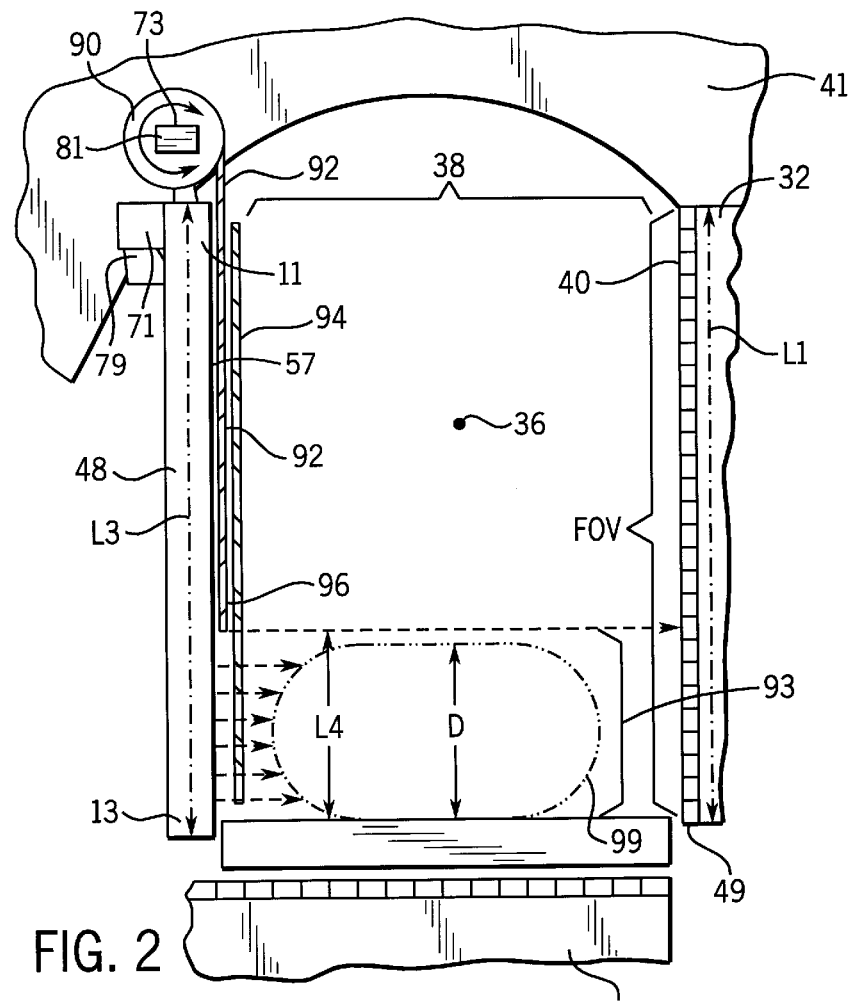
FIG. 2 is a front plan view of the system of FIG. 1.
Figure 6:
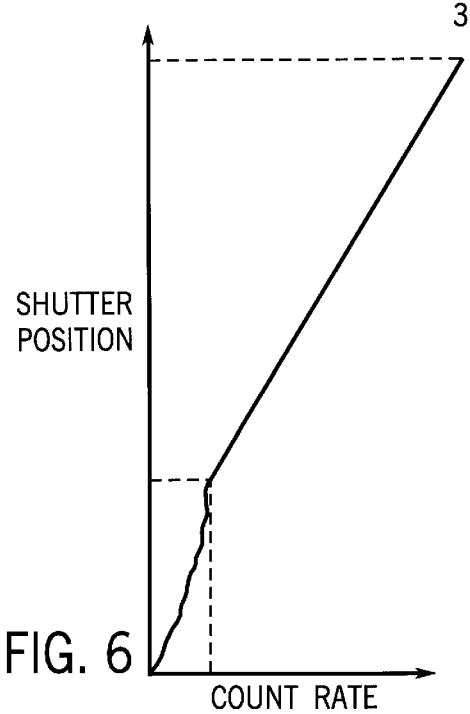
FIG. 6 is a graph showing photon absorption count rate as a function of effective line beam length and correlates with FIG. 2.
Figure 3:
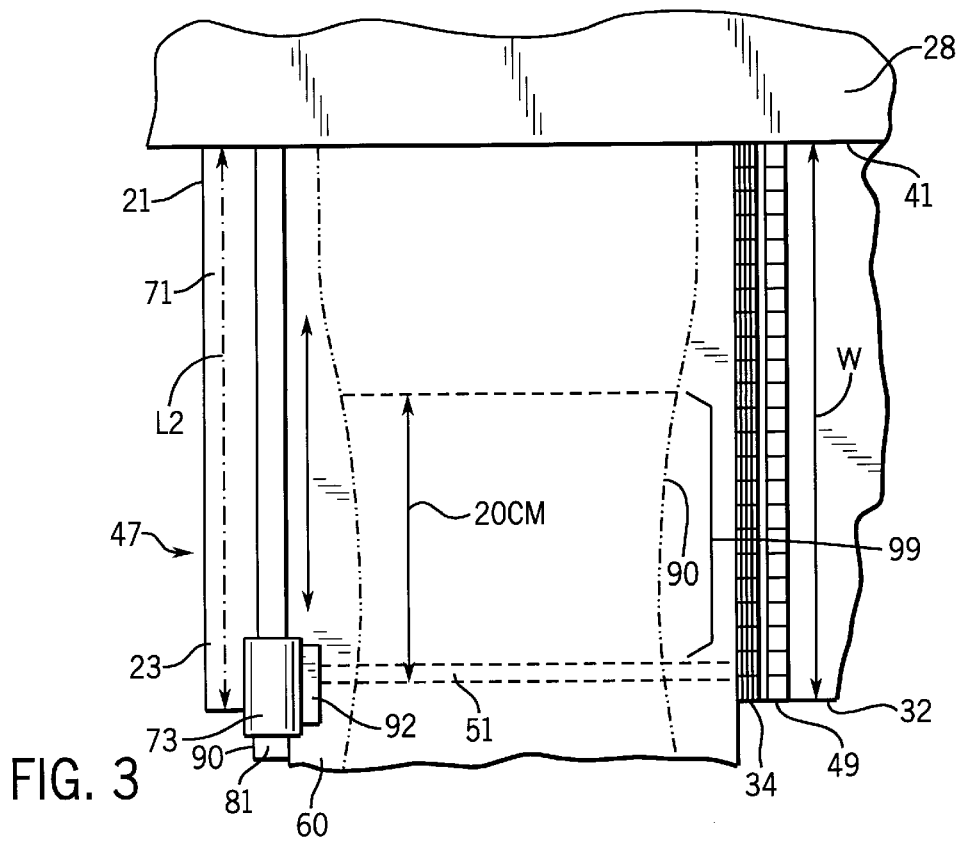
FIG. 3 is a top plan view of the system of FIG. 1.

Referring to FIGS. 1, 2 and 3, emission cameras 32, 34 are mounted securely to the front surface 41 of gantry 28 so that when gantry 28 rotates about axis 36, cameras 32, 34 likewise rotate. Cameras 32, 34 are mounted so that their faces form a 900 angle about axis 36 with an imaging area 38 therebetween. Other angles about axis 36 are also possible.

Cameras 32, 34 are conventional gamma cameras having essentially identical structures and operating in essentially identical manners. For this reason, to the extent that operation of cameras 32 and 34 is discussed herein, only camera 32 will be discussed.

Among other things camera 32 includes a collimator 49, a scintillation crystal (not illustrated) and a plurality of PMTs (also not illustrated) which cooperate to receive photons and generate intensity signals from which an image can be generated. Collimator 49 has length L1 and width W dimensions which define the length and width of a camera FOV.

Referring still to FIGS. 1, 2 and 3, source assembly 47 includes a track 71, a source 48, a shutter assembly 73 and a first motivator 79. Track 71 is an elongated member having proximal and distal ends 21, 23, respectively, and a length L2. Track 71 is fitted to receive a proximal end of source 48.

Track 71 is mounted to front surface 41 opposite camera 32 extending parallel to collimator width dimension W and preferably length L2 is equal to width W (see FIG. 3).

Source 48 is elongated, having proximal and distal ends 11, 13, respectively, a length L3 equal to the length of collimator 49. Source 48 is a gamma ray line source which includes a radioactive element inside a sleeve 75 which forms a slit 57. Slit 57 operates as a collimator to direct a line beam 51 of photons toward camera 32. The transmission source element is chosen so that it emits a line of gamma photons including gamma photons at an energy that is appreciably different than the energy level of the photon emissions produced by the radio pharmaceutical. Slit 57 has a length and, when opened, generates line beam 51 having a length (not identified in the FIGS.) approximately equal to source length L3. Source 48 is mounted at proximal end 11 perpendicularly to track 71 and parallel to collimator dimension L1 with slit 57 opening toward camera 32. Motivator 79 (e.g. a motor) is provided at proximal end 11 and is controlled to move source 48 between the track's proximal and distal ends, 21, 23, respectively. Although not shown in great detail, many different mechanisms for mounting source 48 to track 32 are known in the art and any one of the known mechanisms could be used with the present invention. By moving source 48 from proximal end 21 to distal end 23 of track 32, the camera's entire FOV can be irradiated with photons. The area between source 48 and camera 36 defines imaging area 38. Source 48 is replaceable so that transmission source activity (photons per second per source centimeter) can be modified.

Referring still to FIGS. 2 and 3, shutter assembly 73 includes a spool 90, a shutter 92, a shutter guide 94 and a second motivator 81. Spool 90 is mounted to distal end 11 of source 48 and rotates under control of motivator 81. Shutter 92 includes a ribbon of radio opaque flexible material (e.g. lead based material, etc.) which is capable of effectively blocking transmitter line beam 51. Shutter 92 has a proximal end (not illustrated) which is linked to spool 90 and a distal end 96 which extends from spool 90. Guide 94 (see FIG. 2) is mounted along length L3 of source 48 adjacent slit 57, receives distal shutter end 96 and is constructed to guide shutter 92 in front of slit 57 when shutter 92 is unrolled. Spool 90 can be rotated in either a clockwise direction to unroll shutter 92 to block a portion of beam 51 thereby reducing the effective length of source 48 or can be rotated in a counter clockwise direction to roll up shutter 92 thereby allowing beam 51 to pass across imaging area 38.

Figure 4:
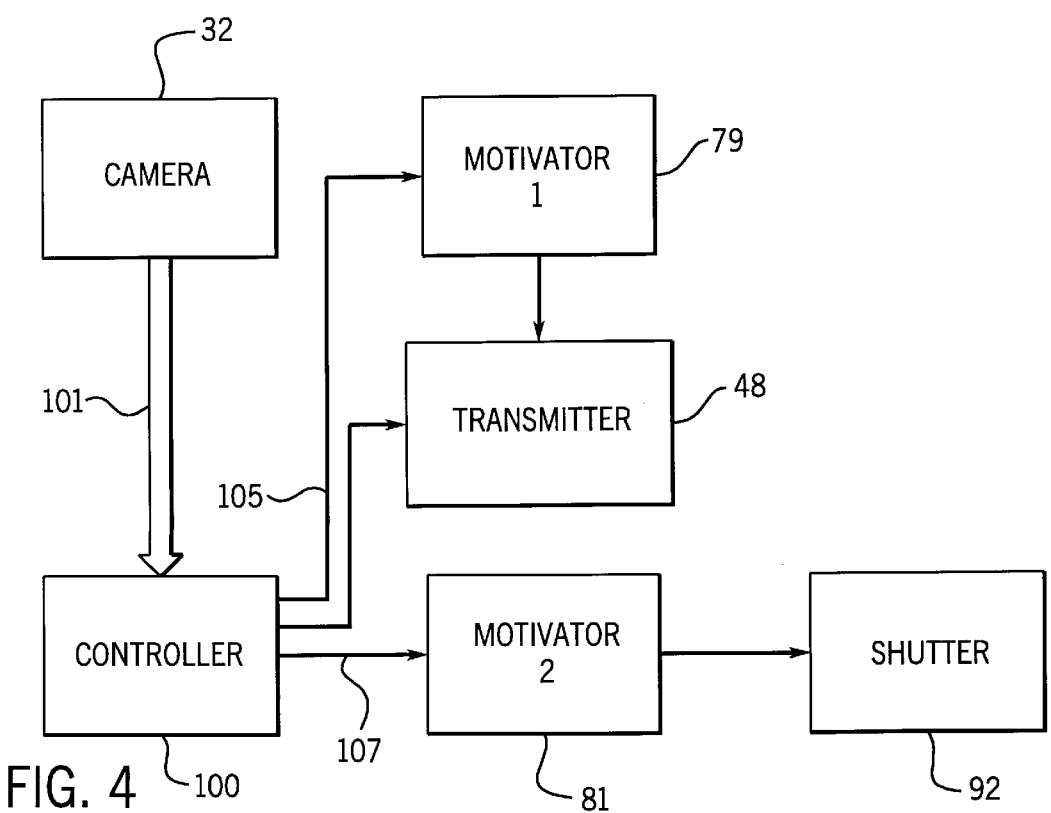
FIG. 4 is a block diagram of a control system for controlling the hardware of FIG. 1.

Referring also to FIG. 4, system 22 also includes a controller 100. Controller 100 is linked to camera 32 and receives intensity signals therefrom via a data bus 101. Controller 100 uses the intensity signals for two purposes. First, controller 100 uses the intensity signals to generate a transmission image. Second, during an imaging period, controller 100 uses the intensity signals to identify an optimal beam length, and an optimal scanning speed as will be described in more detail below.

Controller 100 is also linked to first motivator 79 via a control line 105 for controlling source 48 movement along track 71 and is linked to second motivator 81 via a control line 107 for controlling shutter 92.

B. Operation

Referring still to FIGS. 1, 2 and 3, to reduce the duration of each imaging period the number of detected non-intersecting photons (i.e. photons having flight paths which do not intersect segment 99) is minimized by unrolling shutter 92. Referring specifically to FIG. 2, segment 99 only blocks a portion 93 of the camera's FOV. Therefore, only photons passing through FOV portion 93 are used for imaging purposes. By unrolling shutter 92, portion 93 is minimized and the number of detected non-intersecting photons is reduced.

To identify an optimal shutter configuration (i.e. the degree to which shutter 92 should be unrolled), several different methods and apparatus can be used. For example, the shutter can be roughly optimally configured by knowing the general profile of segment 99 perpendicular to length L3. This knowledge could come, for example, from the prescription of an elliptical orbit for SPECT imaging; the ellipse circumscribing the patient outline. In addition, information generated using a body contouring process could be used for this purpose. In FIG. 2, assuming a segments maximum depth D is 25 centimeters at a specific imaging angle, the optimal shutter configuration would define line beam 51 having an effective length L4 which is essentially identical to depth D (i.e. 25 cm). In this case, assuming a camera FOV of 55 cm, shutter 92 is unrolled 30 cm to define line beam 51 having the desired 25 cm effective length L4.

The invention also contemplates an automatic method for identifying optimum effective length L4. Referring to FIGS. 2, 3 and 4, according to the automatic method camera 32, controller 100, motivator 79 and source 48 cooperate to "hunt" for the optimum length L4. A preferred hunting method will be described with reference to FIGS. 1, 2, 3, 4, and 5.

According to the hunting method, with segment 99 inside area 38, controller 100 controls shutter 92 to modify the degree to which shutter 92 is unrolled. While modifying shutter position, controller 100 receives intensity signals from camera 32 and identifies the number of detected photons. By comparing how a photon absorption rate changes with shutter position, controller 100 identifies the optimum shutter position. For example, in FIG. 2, as shutter 92 is unrolled so that end 96 approaches end 13, initially the count rate decreases linearly as non-intersecting photons are eliminated. However, after the optimal shutter position which defines a beam length L4 equal to depth D, further shutter movement toward end 13 causes a distinct change in the rate at which the count rate changes. By comparing the rate of change of the count rate while moving shutter 92, optimal beam length L4 is identified.

Referring still to FIGS. 1 through 5, with torso segment 99 positioned in area 38, at process block 200, controller 100 is used to fully open shutter 92, source 48 is exposed and a first variable X is set to zero. At block 202, controller 100 uses motivator 79 to begin to unroll shutter 92 at a constant rate thereby reducing effective beam length L4. As shutter 92 is unrolled camera 32 receives both intersecting photons and non-intersecting photons and generates intensity signals which are provided to controller 100.

Controller 100 uses the intensity signals to identify photon events wherein one event corresponds to each photon impacting the crystal of camera 32, the total number of events per unit time being a count rate. At block 204, controller 100 integrates the count rate over a nominal period generating a count rate CR1. Controller 100 then uses rate CR1 to identify a first rate of count rate change $\Delta$CR1. For the purposes of this explanation the nominal period is assumed to be one second although other periods would be acceptable. With value $\Delta$CR1 stored, at block 206 controller 100 again integrates the count rate over a one second nominal period generating a second count rate CR2. Controller 100 then uses rate CR2 to identify a second rate of count rate change $\Delta$CR2.

At decision block 208, controller 100 determines if X is zero. A zero X value indicates that shutter 92 has not reached an optimal unrolled configuration yet. A one X value indicates that shutter 92 has reached or exceeded an optimal unrolled configuration. Initially X=0 and therefore controller 100 control passes to decision block 210.

At block 210, processor 100 compares rates of change ΔCR1 and ΔCR2. Where rate ΔCR1 is essentially equal to rate ΔCR2, line beam length L4 is greater than optimal and control passes to block 212 where variable ΔCR1 is set equal to rate ΔCR2. Then, a new rate ΔCR2 is generated at block 206 and control passes back through block 208 to block 210.

Eventually, as shutter 92 is unrolled, at the point where length L4 is equal to depth D, further shutter unrolling causes a noticeable change in rate ΔCR2 such that rate ΔCR2 is less than rate ΔCR1. At that point, control passes from block 210 to block 216 where variable X is set to 1. In addition, because the optimal position for shutter 92 has been surpassed when rate ΔCR2 is less than rate ΔCR1, at block 216 controller 100 begins to slowly reopen shutter 92 increasing length L4. Control passes to block 290 where variable ΔCR1 is stored and then to block 206 where new rate ΔCR2 is reidentified.

Now, at block 208, X is not equal to zero and control passes to decision block 218. At block 218, controller 100 again compares rate ΔCR1 and rate ΔCR2. Where rate ΔCR1 is not essentially equal to rate ΔCR2 at block 218 control passes to block 216 where controller 100 continues to open the shutter.

At some point, at block 218, rate ΔCR2 will be essentially equal to rate ΔCR1 indicating that shutter 92 has been opened past the optimal point (i.e. L4>D). When rate ΔCR2 is greater than rate ΔCR1, control passes to block 220 where variable X is reset to zero and controller 100 again moves shutter 92 toward the closed position.

Figure 5:
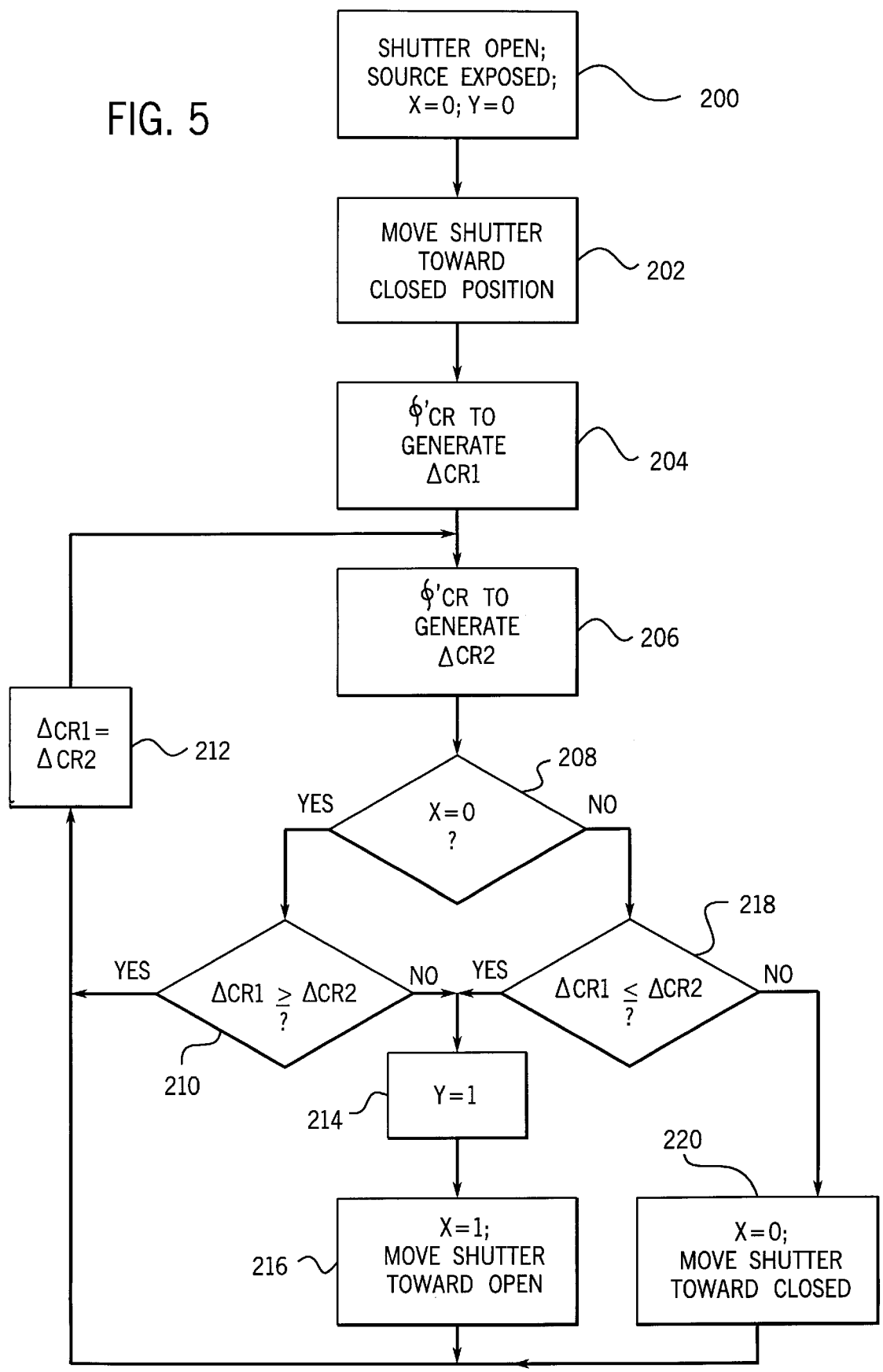
FIG. 5 is a block diagram illustrating a method performed by the system of FIG. 4 to determine an optimal line beam length.

It should be appreciated that if the nominal integrating period is made small, after shutter 982 achieves a position which defines an optimal beam length L4 where non-intersecting photons are minimized, the method of FIG. 5 "hunts" around the optimal length essentially maintaining the optimal length during imaging.

C. Other Embodiments

Figure 7:
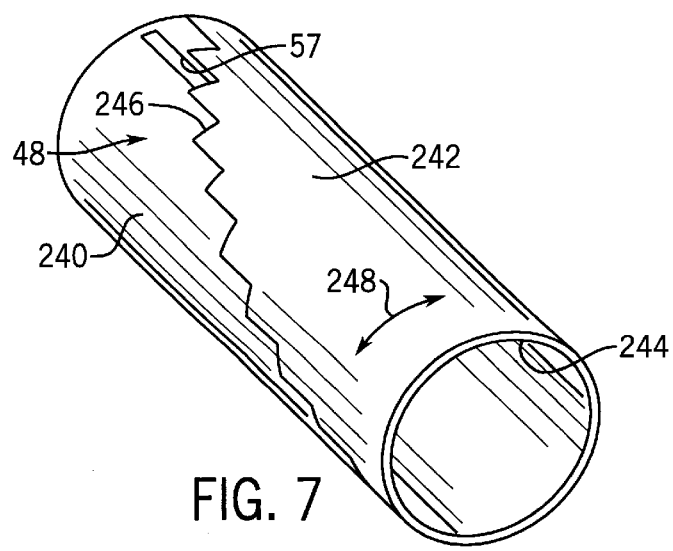
FIG. 7 is a second preferred embodiment of the present invention.

In addition to the shutter assembly described above for use in modifying the effective beam length of line beam 51, other mechanisms could clearly be used for the same purpose. For example, referring to FIG. 7, a different type of shutter mechanism for use in modifying the length of a beam is illustrated. In FIG. 7, a line source 48 includes a source sleeve 240 which defines a source slit 57. A radiation transmitting source (not illustrated) is provided inside sleeve 240 and radiates photons in a line beam which is defined by slit 57. Sleeve 240 is cylindrical. In this embodiment, an attenuation sleeve 242 is formed around sleeve 240 and is preferably, although not necessarily, concentric therewith.

Sleeve 242 can be rotated around sleeve 240, preferably through 360 degrees of rotation. Sleeve 242 includes a flat first edge 244 and a stepped second edge 246 opposite first edge 244. Sleeve 242 can be rotated about sleeve 240 in either a clockwise or counter-clockwise direction as indicated by arrow 248. As sleeve 242 is rotated about sleeve 240, slit 57 is covered to a greater or lesser degree. For example, as illustrated, by rotating sleeve 242 in a clockwise direction, slit 57 becomes less covered and the length thereof therefore becomes longer. However, by rotating sleeve 242 in the counter-clockwise direction, more of slit 57 becomes covered and the length of slit 57 is reduced. Thus, by rotating sleeve 242 the length of slit 57 can be modified and therefore the length of a line beam which emanates from slit 57 can be controlled.

Figure 8:
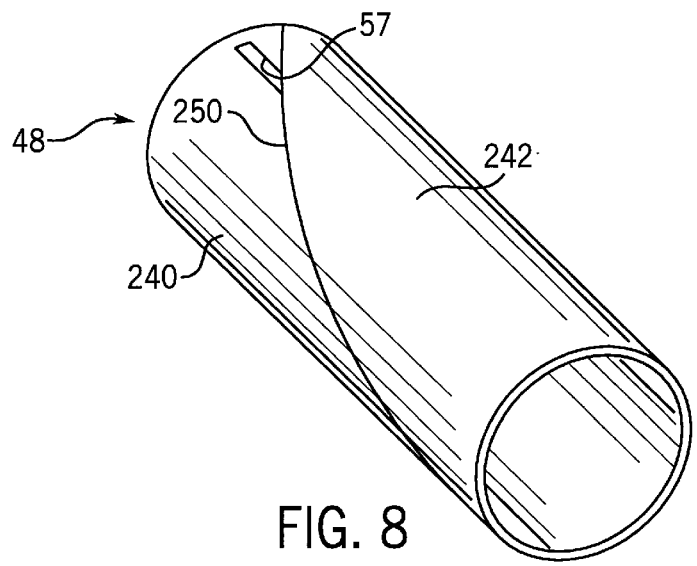
FIG. 8 is a third preferred embodiment of the present invention.

Another apparatus which can be used to modify the length of a line beam is illustrated in FIG. 8. In FIG. 8, source 48 is similar to the transmitter illustrated in FIG. 8, except that a second edge 250 of attenuating sleeve 242 is not stepped, and rather changes approximately linearly. The length of slit 57 in FIG. 8 is modified in the same fashion as the length of slit 57 in FIG. 7, by rotating sleeve 242.

Figure 9:
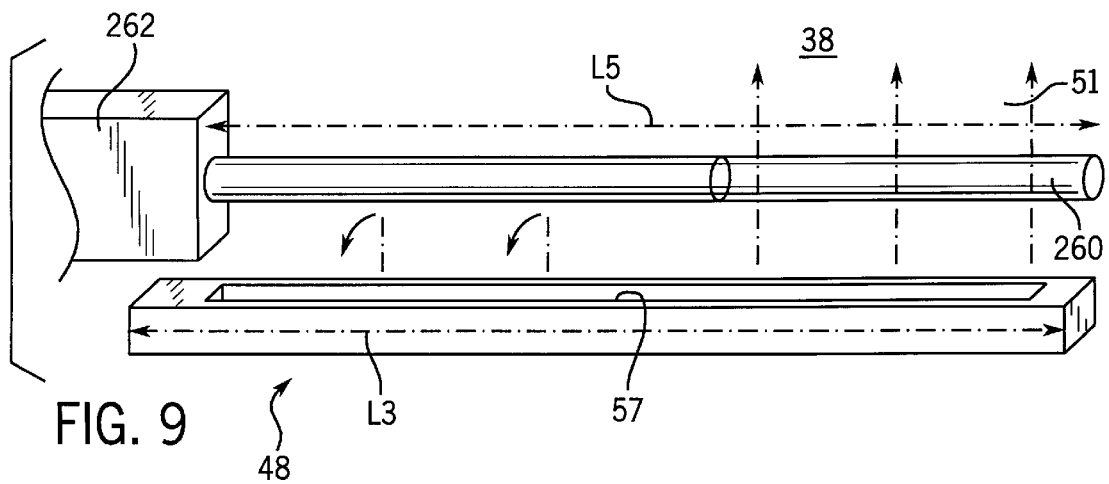
FIG. 9 is a fourth preferred embodiment of the present invention.

Referring now to FIG. 9, another embodiment of a length modifying mechanism is illustrated. In FIG. 9, a line source 48 includes a collimator which forms a slit 57, slit 57 defining a line beam of radiation 51. In this embodiment, the mechanism used for reducing the effective length of beam 51 includes non-attenuating channel 260 and an attenuating liquid reservoir/liquid pump 262. Channel 260 has a length L5 which is equal to or slightly greater than length L3 of source 48. Channel 260 is positioned with respect to slit 57 such that photons emanating from slit 57 pass through channel 260 and then into imaging area 38. Pump/reservoir 262 includes a liquid pump and a reservoir of attenuating liquid and is connected to channel 260 so that attenuating liquid can be forced into channel 260 and removed from channel 260 under the control of controller 100. In this embodiment, to modify the effective length of beam 51, pump/reservoir 262 is controlled to add liquid to and remove liquid from channel 260.

It should be understood that the methods and apparatuses described above are only exemplary and do not limit the scope of the invention, and that various modifications could be made by those skilled in the art that would fall under the scope of the invention. For example, while several different mechanisms for reducing the effective length of the line beam have been described, clearly the present invention is meant to cover other mechanisms for reducing line beam length. In addition, while a preferred hunting method to identify the preferred line beam length has been described above, clearly other methods to identify line beam lengths could be used. For example, a patient profile is often known prior to imaging, and that profile could be used to identify an approximately optimal source length.

Furthermore, the present invention can and should be used as part of a broader system for speeding up imaging. For example, because non-intersecting photons are substantially minimized using the present invention, source 48 can be replaced by a more powerful source capable of increased transmitter activity. Then, imaging speed can be increased accordingly to increase patient throughput.

To apprise the public of the scope of this invention, I make the following claims:

What is claimed is:

1. A gamma transmission apparatus for use with a gamma camera for improving camera image quality and reducing imaging time, the camera having a field of view adjacent a two dimensional imaging area and an impact surface, the camera detecting photons which impact the impact surface and performing detection calculations corresponding to each detected photon, the apparatus comprising:

a line gamma source for providing a line beam of photons directed across at least a portion of the imaging area and toward the impact surface, the source having an active length which extends across one dimension of the imaging area, a maximum beam length limited by the source length; and a length adjuster for adjusting the effective length of the beam, the effective length being the length of the beam directed across the imaging area.

2. The apparatus of claim 1 wherein the imaging area includes first and second areas, an object to be imaged is positioned within the first area and the length adjuster adjusts the effective length so that the beam is directed only through the first area.

3. The apparatus of claim 1 wherein, when an object is positioned within the imaging area, an attenuated portion of the beam subtends the object, the length adjuster adjusting the effective beam length such that substantially all rays in the effective beam length subtend the object.

4. The apparatus of claim 3 further including an optimum length identifier which identifies the attenuation beam portion and controls the length adjuster to adjust the effective beam length such that the effective beam length is substantially equal to the attenuation beam portion.

5. The apparatus of claim 4 wherein the optimum length identifier is a processor which receives photon detection signals from the camera while controlling the length adjuster, the identifier identifying the attenuation beam portion by comparing the number of detection signals as the effective beam length is modified, when the number of detection signals changes rapidly as a function of effective beam length, the identifier identifying the attenuation beam portion.

6. The apparatus of claim 4 wherein externally derived knowledge about said object is used to set beam length.

7. The apparatus of claim 1 wherein the length adjuster is a photon blocker positionable between the imaging area and the source and the effective length is adjusted by varying the position of the blocker with respect to the transmitter.

8. The apparatus of claim 7 wherein the blocker includes a solid attenuating material.

9. A method for use with a gamma camera for improving camera image quality, the camera having a field of view adjacent a two dimensional imaging area and an impact surface, the camera detecting photons which impact the impact surface and performing detection calculations corresponding to each detected photon, the method comprising the steps of:

providing a line beam of photons directed across at least a portion of the imaging area perpendicular to and directed toward the impact surface, the source having an active length which extends across one dimension of the imaging area, a maximum beam length limited by the source length; and a length adjuster for adjusting the effective length of the beam, the effective length being the length of the beam directed across the imaging area.

10. The method of claim 9 wherein the imaging area includes first and second areas, an object to be imaged is positioned within the first area and the method further includes adjusting the effective length so that the beam is directed only through the first area.

* * * * *